HAROLD M. SPURLIN
JAMES W. DAVIS.
INVENTORS.

BY Ernest G. Peterson

AGENT.

Patented June 26, 1951

2,558,543

UNITED STATES PATENT OFFICE 2,558,543

TALL OIL SEPARATION PROCESS

James W. Davis, Wilmington, and Harold M. Spurlin, Marshallton, Del., assignors to Hercules Powder Company, Wilmington, Del., a corporation of Delaware Application October 18, 1949, Serial No. 122,068

14 Claims. (Cl. 260—97.6)

This invention relates in general to a separation between fatty acid and resin components of tall oil and, in particular, to a solvent extraction for the separation therebetween.

In efforts to obtain valuable products from tall oil, the separation between the fatty acid components and the resin acid components of tall oil has usually been attempted by means of chemical modification, such as partial esterification, followed by physical separation between the components, for example, by fractional distillation. It has also been known, for example, as in U. S. Patent 2,363,925, to separate the fatty acid and resin acid components of tall oil by an extraction between an organic solvent and an aqueous solvent whereby the fatty acids and neutral bodies are preferentially dissolved in the organic solvent and the resin acids are preferentially dissolved in the aqueous solvent.

Now in accordance with the present invention, it has been found that the components of tall oil or the like can be separated into fractions comprising substantially pure fatty acids and substantially pure resin acids through a process which includes the step of two-phase solvent separation between alkaline aqueous solvent and an organic solvent immiscible therewith, in the presence of an emulsion preventing agent such as a water-miscible lower alcohol or the like whereby the resin acid fraction is recovered from the organic solvent and the fatty acid fraction is recovered from the aqueous solvent. In carrying out the present invention, it has been found that a resin acid fraction and a fatty acid fraction, each substantially free from the other, can be obtained by distributing the mixture of resin and fatty components, between two solvents in countercurrent flow, employing a hydrocarbon solvent such as, for example, gasoline, naphtha, or the like, and an alkaline aqueous medium such as, for example, an aqueous alkali or ammonium carbonate, bicarbonate, and hydroxide or the like. If it be desired to recover the free fatty acids in preference to the fatty acid soaps, these may be obtained through treatment of the aqueous mixture with an acidic material such as, for example, a mineral acid and, if desired, various constituents and components may be recycled or returned for reflux through the system.

The general nature of the invention having been set forth, the invention will now be illustrated by the following examples in conjunction with the accompanying drawings wherein.

Figure 1:
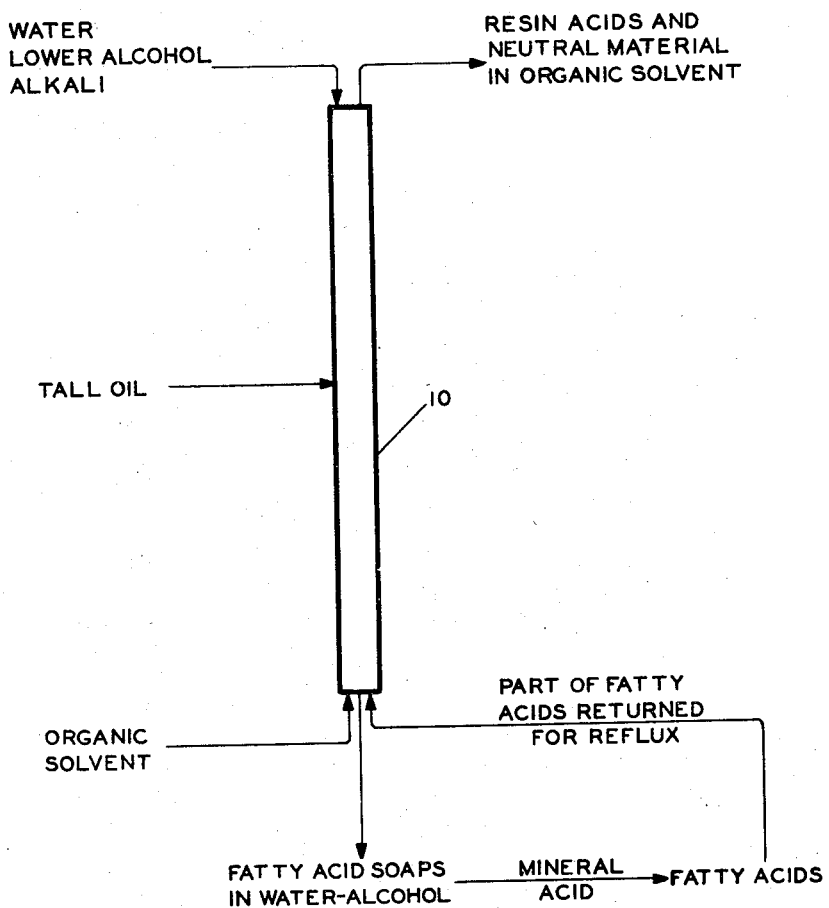
Figure 1 is a diagrammatic flow sheet of a continuous countercurrent extraction procedure in accordance with one embodiment of the invention.

The process in general, as illustrated in Figure 1, comprises continuously introducing into an extraction zone such as a vertical extraction column 10, preferably at a point intermediate between the ends thereof, a source of resin and fatty acid materials such as tall oil, black liquor skimmings, or the like, and simultaneously and continuously introducing at the upper end thereof a relatively heavy solvent such as an aqueous alkaline solution, and simultaneously and continuously introducing at the lower end thereof in countercurrent flow a lighter solvent such as an organic solvent immiscible with the aqueous solution, distributing the resin and fatty fractions between the immiscible solvents, and withdrawing therefrom solutions of the fatty acid component preferentially in one solvent medium and the resin acid component preferentially in the other.

Figure 2:
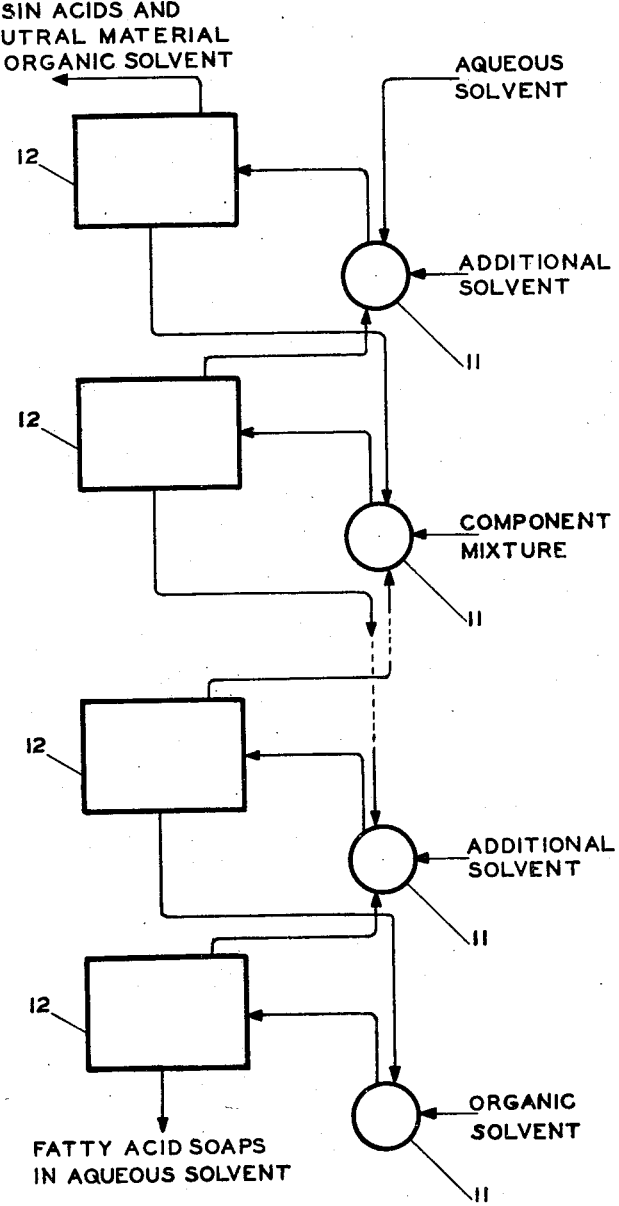
Figure 2 is a diagrammatic flow sheet of a continuous countercurrent extraction procedure in accordance with a second embodiment of the invention.

According to another embodiment of the invention, the countercurrent extraction process is carried out through a series of extraction stages as illustrated in Figure 2. Each of these extraction stages comprises means for contacting and separating the two immiscible liquids in countercurrent flow such as, for example, a mixer 11 and a settler 12. In operation, the two phases are mixed together in a mixer and then passed to a settler wherein the lighter liquid separates into an upper layer and the heavier liquid into a lower layer. This lower layer is then passed to the mixer in the succeeding stage and the upper layer is countercurrently passed to the mixer in the preceding stage whereupon the mixing and separation cycle is repeated. The solvents and the material to be fractionated are added as desired to the appropriate end stages and, if desired, additional amounts of either solvent may be added at intermediate points as indicated in the figure, and ultimately, the fraction selectively soluble in the lighter solvent is recovered at one end of the series of stages and the fraction selectively soluble in the heavier solvent is recovered at the other end of the series.

*Example 1*

Crude tall oil containing 43% resin acids, 39% fatty acids, and 18% neutral material by analysis was dissolved in gasoline to make a 19.8% (weight by volume) solution. This solution was fed at a rate of 2.8 parts (by volume) per minute to the 10th-from-bottom plate of a countercurrent extraction column containing 28 plates. An 0.61% solution of NaOH in 35% (by volume) aqueous isopropanol was fed to the top of the column at a rate of 10 parts (by volume) per minute and gasoline was pumped into the bottom of the column at a rate of 12 parts (by volume) per minute.

A solution of fatty acid soaps in aqueous isopropanol was drawn off at the bottom of the column. This solution was acidified continuously and 60% of the fatty acids recovered was pumped back into the bottom of the column with the gasoline. Resin acids and neutral material dissolved in gasoline were drawn off at the top of the column. For each 100 parts (by weight) of the crude tall oil fed to the column there was obtained 37 parts (by weight) of fatty acids having the following analysis: 94.5% fatty acids, 2.5% resin acids, and 3.0% neutral material; and 63 parts (by weight) resin acids and neutral material having the following analysis: 60.0% resin acids, 5.8% fatty acids, and 34.2% neutral material.

Example 2

A quantity of crude skimmings (about 150 parts) containing 105 parts of tall oil was mixed with 150 parts of water and heated to 80° C. After solution of the soaps was complete, 1.5 parts by weight of NaOH and 9.0 parts of Na₂SO₄ was added and dissolved whereupon the soaps separated as a soft curd. The mixture was cooled and allowed to settle and about 150 parts of dark liquor was drawn off at the bottom and discarded. The solution, salting out, and separation of the dark liquors was repeated and then 8 parts of concentrated H₂SO₄ in 8 parts of water and 10 parts of isopropyl alcohol was mixed in and the mixture allowed to stand without agitation. A water layer separated and was drawn off at the bottom leaving a clear liquid containing 100 parts of partially saponified tall oil.

This settled mixture was fed continuously to the fifth stage of a countercurrent extractor consisting of twelve mixing and twelve settling stages. These mixers and settlers were arranged so that the heavier phase moved consecutively from the first to the second to the third, etc., to the twelfth stage while the lighter phase moved consecutively through the mixers and settlers in the opposite direction.

The flow rates were so regulated that for each 100 parts of partially saponified tall oil fed to the fifth stage of the extractor 8.84 parts of NaOH dissolved in 500 parts of isopropyl alcohol and 1175 parts of water was fed to the first mixer while 50 parts of crude resin acids in 1120 parts of gasoline was collected from the first settler. The heavier phase from the twelfth settler was treated continuously with a slight excess of sulfuric acid (about 19 parts) to give 139 parts of crude fatty acids. Of this material, 89 parts dissolved in 1120 parts of gasoline was returned continuously to the twelfth mixer to provide the necessary reflux and 50 parts was collected as crude fatty acid product.

The crude products were then refined, as by distillation, to remove tars and resinous impurities. From 100 parts of a feed material containing 41.5% resin acids, 49.5% fatty acids, and 9.0% neutral material, there was obtained 43–45 parts of pure fatty acids containing less than 1% of resin acids along with 43–45 parts of a resin acid fraction containing about 75% resin acids, 8% fatty acids, and 17% neutral material.

Example 3

One hundred parts crude tall oil was mixed with 6.1 parts of NaOH dissolved in 45 parts of water and 5 parts of isopropyl alcohol to give a partially saponified tall oil solution. This solution was fed continuously to the fifth stage of the countercurrent extractor described in Example 2 with flow rates in accordance with the flow rates set forth in Example 2. The products ultimately recovered by following the procedure set forth in the previous example comprised about 43% (based on the weight of feed) of fatty acids containing less than 1% resin acids and about 45% (based on the weight of feed) of a resin acid fraction containing about 75% resin acids with smaller quantities of fatty acids and neutral bodies. Variations in the rates of flow as are apparent to those skilled in the art enabled control of the proportions and purities of the products separated.

As the raw material according to this invention, there is employed a mixture of naturally occurring resin acids and fatty acids such as may be obtained as a by-product of the paper industry in the sulfate process for the preparation of a paper pulp. It will be understood that either the crude or refined black liquor skimmings, or the acidified liquor known as tall oil, or other mixture of resin and fatty acid mixtures and soaps thereof may be separated in accordance with this invention, although according to preferred embodiments of the invention at least a preliminary purification step such as, for example, a solution and salting out of the soaps to remove lignin and the like from crude black liquor skimmings. These compositions typically are characterized by containing substantial proportions each of fatty and resin components such as, for example, in the general neighborhood of about 40% fatty acids and about 40% resin acids, and the remainder neutral bodies, with the exact composition varying depending on the source thereof.

The organic liquid, which is the preferential solvent for the resin acids and neutral bodies in accordance with this invention, is an organic liquid immiscible with water such as, for example, a liquid hydrocarbon or the like such as gasoline, naphtha, benzene, petroleum ether or other petroleum solvent fractions, or the like. There likewise may be employed derivatives of hydrocarbons and the like such as, for example, chloroform, carbon tetrachloride, and other chlorinated solvents which are immiscible with aqueous alkali.

In the aqueous mixture, which is a preferential solvent for the fatty acid soaps according to the invention, there is employed a suitable alkali and a suitable agent to prevent emulsification. The alkali may be any appropriate water-soluble alkaline material which is relatively immiscible with the organic solvent employed and includes alkalies such as the alkali metal or ammonium hydroxides, carbonates, bicarbonates, and the like. Because of the efficiency of fatty acid and resin acid soaps as emulsification agents, there is employed together with the aqueous medium an agent to reduce or resolve emulsification, preferably an agent which is miscible with the aqueous alkali and, in a preferred embodiment of the invention, being selected from the lower alcohols such as methyl, ethyl, propyl, butyl alcohol and the like. It will be obvious that the breaking of the emulsion is practiced to improve the rate of operation to make the separation commercially feasible and that, accordingly, there may be substituted other agents to prevent or resolve emulsification, such agents being those known in the art whose use is within the ordinary skill of the art.

The process in which the various components and solvents are utilized for the separation between the components of the resin acid-fatty acid mixtures is a countercurrent extraction, preferably continuous, between the two immiscible solvents, namely, the organic solvent and the alkaline aqueous solvent, whereby the resin acids are preferentially dissolved in the organic solvent and the fatty acid soaps are preferentially formed and dissolved in the aqueous medium. A typical countercurrent extraction process as illustrated in Figure 1 comprises the introduction of the tall oil or other suitable starting material such as, for example, black liquor skimmings or the like, preferably at a point intermediate between the ends of a vertical extraction column with the introduction at the lower end of the lighter extracting solvent and the introduction at the upper end of the heavier extracting solvent.

It will be apparent to those skilled in the art that the present process is not dependent on specific apparatus but is, on the contrary, process steps and a sequence of steps as shown herein and as defined in the claims. For example, instead of the single extraction chamber of Figure 1, there may be employed a series of extraction stages separately maintained in countercurrent operation as shown in Figure 2. Likewise, other apparatus and equipment may be employed in furtherance of the process of the invention.

For preferred operation of the process of the present invention, it is desirable to employ an extraction zone having a large number of transfer stages and, likewise, to employ the components and solvents in preferred proportions and with preferred reflux ratios. Thus, for the preparation of a substantially pure fatty acid fraction and a substantially pure resin acid fraction from a mixture thereof containing about 40% resin acids and 40% fatty acids together with neutral materials, it has been found desirable to employ about 5 to about 50 parts each of the organic solvent and aqueous solvent for each part of the tall oil introduced into the extraction column, usually about 7 to about 25 parts to maintain the concentration of the ingredients at a level such that the soap is present in the aqueous solution in less than about 15% concentration and preferably between about 5% and about 10%. Likewise, in order to give optimum separation between the liquid phases and in order to give a substantial absence of emulsification in the extraction column, it is desirable to employ about 20 to about 40% by volume and preferably about 30% of the emulsification prevention agent such as isopropanol or other lower alcohol. It will be apparent that these preferred conditions can be attained through the use of about 20 parts by volume of organic solvent and about 20 parts by volume of aqueous solvent containing substantially enough alkaline material to neutralize all the fatty acid present, for example, somewhat less than the equivalent of 1% of sodium hydroxide for each part by volume of the aqueous phase added to the extraction zone returning for reflux about 30 to about 60% of the recovered fatty acids.

As will be apparent from the process and its operation, the present invention makes possible the separation between resin acids and fatty acids to yield separate fractions of each component substantially free from the other and makes possible the separation of a substantially pure fatty acid fraction relatively free from neutral bodies through a single continuous extraction step.

What we claim and desire to protect by Letters Patent is:

1. In a process of treating mixtures of resin and fatty acid components for separation therebetween, the steps comprising passing said mixture into a water-immiscible organic solvent and an alkaline aqueous medium in amount to partially neutralize the acid mixture and having a preferential solvent action for fatty acid soaps, in countercurrent flow, and recovering therefrom an organic solvent solution containing predominantly the resin acids of the mixture and an aqueous solution containing predominantly soaps of the fatty acids of the mixture.

2. In a process of treating mixtures of resin and fatty acid components for separation therebetween, the steps comprising passing said mixture into a water-immiscible organic solvent and an alkaline aqueous medium in amount to partially neutralize the acid mixture and having a preferential solvent action for fatty acid soaps, in countercurrent flow into a vertical extraction column, and recovering therefrom an organic solvent solution containing predominantly the resin acids of the mixture and an aqueous solution containing predominantly soaps of the fatty acids of the mixture.

3. In a process of treating mixtures of resin and fatty acid components for separation therebetween, the steps comprising introducing into a series of extraction stages separately maintained in countercurrent operation, the mixture of resin and fatty acid components, a water-immiscible organic solvent, and an alkaline aqueous medium in amount to partially neutrilize the acid mixture and having a preferential solvent action for fatty acid soaps, and recovering therefrom an organic solvent solution containing predominantly the resin acids of the mixture and an aqueous solution containing predominantly soaps of the fatty acids of the mixture.

4. In a process for separating resin and fatty components of tall oil, the steps comprising passing said mixture into a water-immiscible organic solvent, and an alkaline aqueous medium in amount to partially neutralize the acid mixture and having a preferential solvent action for fatty acid soaps, in countercurrent flow, and recovering therefrom an organic solvent solution containing predominantly the resin acids of the tall oil and an aqueous solution containing predominantly soaps of the fatty acids of the tall oil.

5. In a process for separating resin and fatty components of tall oil, the steps comprising continuously introducing, in countercurrent flow, into a vertical extraction column, tall oil, a water-immiscible organic solvent, and an alkaline aqueous medium in amount to partially neutralize the acid mixture and having a preferential solvent action for fatty acid soaps, and continuously recovering therefrom an organic solvent solution containing predominantly the resin acids of the tall oil and an aqueous solution containing predominantly soaps of the fatty acids of the tall oil.

6. In a process for separating resin and fatty components of tall oil, the steps comprising continuously introducing into a series of extraction stages separately maintained in countercurrent operation, tall oil, a water-immiscible organic solvent, and an alkaline aqueous medium in amount to partially neutralize the acid mixture and having a preferential solvent action for fatty acid soaps and continuously recovering therefrom an organic solvent solution containing predominantly the resin acids of the tall oil and an aqueous solution containing predominantly soaps of the fatty acids of the tall oil.

7. In a process for separating resin and fatty components of tall oil, the steps comprising continuously introducting, in countercurrent flow, into a vertical extraction column, tall oil, a water-immiscible organic solvent, and an alkaline aqueous medium in amount to partially neutralize the acid mixture and having a preferential solvent action for fatty acid soaps and containing a water-soluble emulsification preventing agent and continuously recovering therefrom an organic solvent solution containing predominantly the resin acids of the tall oil and an aqueous solution containing predominantly soaps of the fatty acids of the tall oil.

8. In a process for separating resin and fatty components of tall oil, the steps comprising continuously introducing into a series of extraction stages separately maintained in countercurrent operation, tall oil, a water-immiscible organic solvent, and an alkaline aqueous medium in amount to partially neutralize the acid mixture and having a preferential solvent action for fatty acid soaps and containing a water-soluble emulsification preventing agent and continuously recovering therefrom an organic solvent solution containing predominantly the resin acids of the tall oil and an aqueous solution containing predominantly soaps of the fatty acids of the tall oil.

9. In a process for separating resin and fatty components of tall oil, the steps comprising continuously introducing, in countercurrent flow, into a vertical extraction column, tall oil, a water-immiscible organic solvent, and an alkaline aqueous medium in amount to partially neutralize the acid mixture and having a preferential solvent action for fatty acid soaps and containing as an emulsification preventing agent a water-miscible lower alcohol, and continuously recovering therefrom an organic solvent solution containing predominantly the resin acids of the tall oil and an aqueous solution containing predominantly soaps of the fatty acids of the tall oil.

10. In a process for separating resin and fatty components of tall oil, the steps comprising continuously introducing into a series of extraction stages separately maintained in countercurrent operation, tall oil, a water-immiscible organic solvent, and an alkaline aqueous medium in amount to partially neutralize the acid mixture and having a preferential solvent action for fatty acid soaps and containing as an emulsification preventing agent a water-miscible lower alcohol, and continuously recovering therefrom an organic solvent solution containing predominantly the resin acids of the tall oil and an aqueous solution containing predominantly soaps of the fatty acids of the tall oil.

11. In a process for separating resin and fatty components of tall oil, the steps comprising continuously introducing, in countercurrent flow, into a vertical extraction column, tall oil, a water-immiscible liquid hydrocarbon, and an alkaline solution of water and isopropanol in amount to partially neutralize the acid mixture, and continuously recovering therefrom an organic solvent solution containing predominantly the resin acids of the tall oil and an aqueous solution containing predominantly soaps of the fatty acids of the tall oil.

12. In a process for separating resin and fatty components of tall oil, the steps comprising continuously introducing into a series of extraction stages separately maintained in countercurrent operation, tall oil, a water-immiscible liquid hydrocarbon, and an alkaline solution of water and isopropanol in amount to partially neutralize the acid mixture, and continuously recovering therefrom an organic solvent solution containing predominantly the resin acids of the tall oil and an aqueous solution containing predominantly soaps of the fatty acids of the tall oil.

13. In a process for separating resin and fatty components of tall oil, the steps comprising continuously introducing, in countercurrent flow, into a vertical extraction column, tall oil, a water-immiscible liquid petroleum solvent fraction, and an alkaline aqueous solution of water and isopropanol in amount to partially neutralize the acid mixture, and continuously recovering therefrom a petroleum solvent solution containing predominantly the resin acids of the tall oil and an aqueous solution containing predominantly soaps of the fatty acids of the tall oil.

14. In a process for separating resin and fatty components of tall oil, the steps comprising continuously introducing into a series of extraction stages separately maintained in countercurrent operation, tall oil, a water-immiscible liquid petroleum solvent fraction, and an alkaline aqueous solution of water and isopropanol in amount to partially neutralize the acid mixture, and continuously recovering therefrom a petroleum solvent solution containing predominantly the resin acids of the tall oil and an aqueous solution containing predominantly soaps of the fatty acids of the tall oil.

JAMES W. DAVIS.
HAROLD M. SPURLIN.

REFERENCES CITED

The following references are of record in the file of this patent:

UNITED STATES PATENTS

| Number | Name | Date |
|---|---|---|
| 2,437,643 | Houpt | Mar. 9, 1948 |